United States Patent [19]

Oldfelt

[11] Patent Number: 5,421,040
[45] Date of Patent: * Jun. 6, 1995

[54] VACUUM TOILET SYSTEM

[75] Inventor: Sven Oldfelt, Vaxholm, Sweden

[73] Assignee: Metra Oy AB, Helsinki, Finland

[ * ] Notice: The portion of the term of this patent subsequent to Sep. 21, 2010 has been disclaimed.

[21] Appl. No.: 97,087

[22] Filed: Jul. 23, 1993

Related U.S. Application Data

[63] Continuation-in-part of Ser. No. 394,072, Aug. 15, 1989, Pat. No. 5,245,711.

[30] Foreign Application Priority Data

Sep. 6, 1988 [SE] Sweden ................. 8803119
Sep. 6, 1988 [SE] Sweden ................. 8803120

[51] Int. Cl.⁶ .................................. E03D 11/10
[52] U.S. Cl. ................................... 4/435
[58] Field of Search ............. 4/316, 323, 431–433, 4/435, 436, 665

[56] References Cited

U.S. PATENT DOCUMENTS

| | | | |
|---|---|---|---|
| 3,154,796 | 11/1964 | Bruce | 4/431 |
| 3,329,974 | 7/1967 | Belasco et al. | 4/316 |
| 3,995,327 | 12/1976 | Hendrick . | |
| 4,063,315 | 12/1977 | Carolan et al. | 4/316 |
| 4,376,314 | 3/1983 | Iwans | 4/431 |
| 4,521,925 | 6/1985 | Chen et al. | 4/323 |
| 4,713,847 | 12/1987 | Oldfelt et al. | 4/316 |

FOREIGN PATENT DOCUMENTS

| | | |
|---|---|---|
| 2286922 | 4/1976 | France . |
| 3110558 | 4/1983 | Germany . |
| 3536691 | 4/1987 | Germany . |

Primary Examiner—Charles E. Phillips
Attorney, Agent, or Firm—Smith-Hill and Bedell

[57] ABSTRACT

A vacuum toilet system comprises a toilet bowl having a cover mounted for movement relative to the toilet bowl between an open position and a closed position, the cover being in at least partially sealing relation with the rim when in the closed position. A liquid supply opening is provided for introducing liquid into the toilet bowl when the cover is in the closed position. A discharge valve connects the outlet opening of the toilet bowl to a sewer pipe, in which a partial vacuum can be established. A reservoir has an inlet opening for receiving rinse liquid and an outlet opening in communication with the liquid supply opening. The inlet opening of the reservoir is exposed to substantially the same pressure as the liquid supply opening when the toilet bowl cover is in the open position and the discharge valve is closed. Rinse liquid is drawn from the reservoir into the toilet bowl by way of the liquid supply opening when the discharge valve is open and the cover is in the closed position.

4 Claims, 5 Drawing Sheets

VACUUM TOILET SYSTEM

CROSS-REFERENCE TO RELATED APPLICATION

This is a continuation-in-part of Application Ser. No. 07/394,072, filed Aug. 15, 1989, now U.S. Pat. No. 5,245,711, issued Sep. 21, 1993 the disclosure of which is hereby incorporated by reference herein.

BACKGROUND OF THE INVENTION

This invention relates to a vacuum toilet system.

Vacuum toilet systems have been known for many years. The modern vacuum toilet system comprises a waste-receiving toilet bowl, a sewer pipe that can be placed under a pressure that is substantially lower than that in the interior of the toilet bowl, and a discharge valve for controlling passage of material from the toilet bowl into the sewer pipe. A rinse liquid outlet is provided near the rim of the toilet bowl and is connected through a rinse liquid valve to a source of pressurized rinse liquid. In order to flush the contents of the bowl into the sewer pipe, the discharge valve is opened and the force due to the pressure difference between the interior of the bowl and the sewer pipe imparts a high initial acceleration to the bowl contents. During a flush cycle, the rinse liquid valve is opened and rinse liquid is introduced into the toilet bowl. The rinse liquid aids in cleansing the toilet bowl but does not itself serve to propel the waste from the toilet bowl and along the sewer. Accordingly, a modern vacuum toilet system is able to operate satisfactorily using only a very small quantity of water as rinse liquid, and therefore the vacuum toilet system is normally used in circumstances where water must be conserved. The desired high acceleration necessitates that the sewer pipe be essentially empty, since if the pipe were filled with water it would then be necessary to accelerate a large mass in order to empty the toilet bowl. During a flush cycle, the volume of air that enters the sewer pipe is typically at least 50 times the volume of sewage (waste plus rinse liquid).

Non-recirculating vacuum toilet systems using plain water as a rinse liquid are attractive for use in aircraft. In such a system, it is conventional for the rinse liquid to be provided from the aircraft's potable water system. The potable water system includes a tank, pipes connecting the tank to consuming devices, such as the vacuum toilets and hand basins, and a pump for maintaining the water in the pipes under pressure.

An aircraft toilet system comprises a holding tank for receiving waste material from the toilet bowl. In order to avoid transporting material that could be discharged from the aircraft in flight, gray water, i.e., water that, though not potable, can be discharged into the environment without treatment, e.g. water from hand basins and from galley sinks, is not fed into the vacuum toilet system so that it enters the holding tank but is discharged from the aircraft through a drain mast.

U.S. Pat. No. 4,713,847 issued Dec. 22, 1987, the disclosure of which is hereby incorporated by reference herein, discloses a vacuum toilet system in which a pump is used to deliver rinse water to a toilet bowl under control of a valve that is opened in response to actuation of a flush switch.

It has been proposed that an aircraft vacuum toilet system should employ gray water as the rinse liquid for the vacuum toilets. According to this proposal, which, as far as the applicants are aware, had not been reduced to practice at the time of filing of the co-pending application, a reservoir for collecting gray water would be provided, and each toilet would be provided with means for drawing gray water from the reservoir and delivering it to the toilet in response to actuation of a flush switch.

SUMMARY OF THE INVENTION

In accordance with a first aspect of the present invention there is provided a vacuum toilet system comprising a toilet bowl having a rim and an outlet opening, a toilet bowl cover mounted for movement relative to the toilet bowl between an open position and a closed position, a sewer pipe having an interior space, means for establishing a partial vacuum in the interior space of the sewer pipe, a normally closed discharge valve connecting the outlet opening of the toilet bowl to the sewer pipe, and means defining a liquid supply opening for introducing liquid into the toilet bowl, the system being of the kind in which the interior space of the sewer pipe is placed under partial vacuum and sewage in the toilet bowl is forced into the sewer pipe by pressure difference between the toilet bowl and the interior space of the sewer pipe when the discharge valve is opened, and sewage is transported along the sewer pipe due to entry of ambient air into the sewer pipe, and wherein the toilet bowl cover is in at least partially sealing relation with the rim when in the closed position and the system further comprises a source of rinse liquid, and a reservoir having an inlet opening for receiving rinse liquid from the source and an outlet opening in communication with the liquid supply opening, the inlet opening of the reservoir being exposed to substantially the same pressure as the liquid supply opening when the cover is in the open position and the discharge valve is closed, whereby rinse liquid is drawn from the reservoir into the toilet bowl by way of the liquid supply opening when the discharge valve is open and the cover is in the closed position, and the system being such that the volume of rinse liquid that is drawn from the reservoir is substantially the same on each flush of the toilet bowl.

In accordance with a second aspect of the present invention there is provided a water supply and disposal system for a transport vehicle, comprising a toilet bowl having a rim and an outlet opening, a toilet bowl cover mounted for movement relative to the toilet bowl between an open position and a closed position, a sewer pipe having an interior space, means for establishing a partial vacuum in the interior space of the sewer pipe, a normally closed discharge valve connecting the outlet opening of the toilet bowl to the sewer pipe, means defining a liquid supply opening for introducing liquid into the toilet bowl, a water utilization unit, such as a hand basin, having a water outlet., and means for providing water to the water utilization unit, the water supply and disposal system being of the kind in which the interior space of the sewer pipe is placed under partial vacuum and sewage in the toilet bowl is forced into the sewer pipe by pressure difference between the toilet bowl and the interior space of the sewer pipe when the discharge valve is opened and is transported along the sewer pipe due to entry of ambient air into the sewer pipe, and wherein the toilet bowl cover is in at least partially sealing relation with the rim when in the closed position and the system further comprises a reservoir having an inlet opening for receiving water from the water utilization unit and an outlet opening in direct open communication with the liquid supply opening, the inlet opening of the reservoir being exposed to substantially the same pressure as the liquid supply opening when the cover is in the open position and the discharge valve is closed, whereby water is drawn from the reservoir into the toilet bowl by way of the liquid supply opening when the discharge valve is open and the cover is in the closed position, and means for ensuring that each time the discharge valve is opened, the volume of water that is drawn from the reservoir into the toilet bowl is substantially the same.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
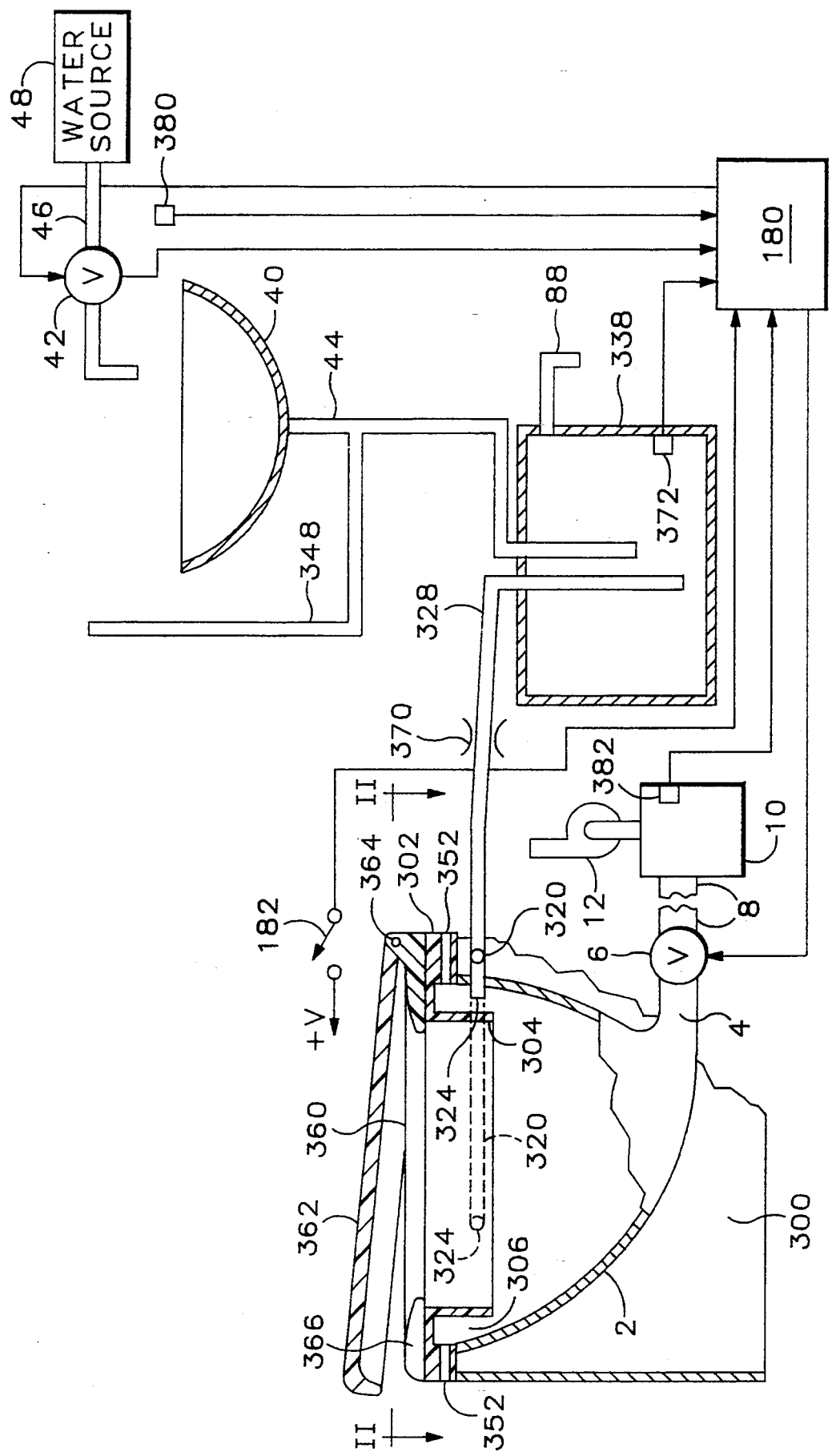
FIG. 1 is a schematic diagram of a first vacuum toilet system embodying the present invention, including a toilet bowl and a gray water reservoir.
Figure 2:
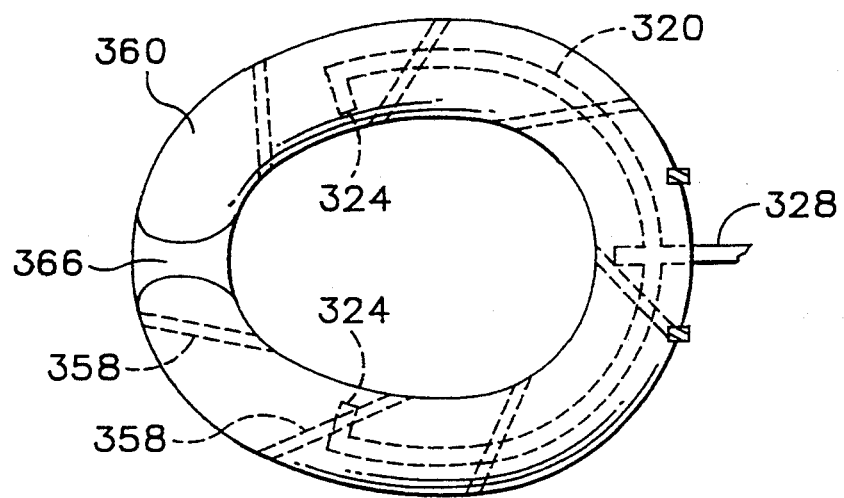
FIG. 2 is a sectional view taken on the line II—II of FIG. 1.

The vacuum toilet system illustrated in FIGS. 1 and 2 comprises a toilet bowl 2 which defines an interior space for receiving waste material and has an outlet opening 4. The outlet opening is connected to one side of an electrically driven discharge valve 6, and the opposite side of the discharge valve is connected through a sewer pipe 8 to a holding tank 10. The discharge valve 6 controls flow of material from the toilet bowl to the holding tank. A blower 12 is used to establish a sufficient pressure difference of about 250–500 mbar between the ambient atmosphere and the interior of the holding tank. Reference may be made to U.S. Pat. No. 4,713,847 for further information regarding the manner in which material is transported to the tank and removed from the tank.

The toilet bowl 2 is mounted in an external shroud 300 which is spaced from the toilet bowl. An air supply member 302 made of molded synthetic polymer material is secured to the rim of the toilet bowl and bridges the space between the toilet bowl and the shroud. The member 302 is generally annular and includes a flange 304 which extends downwardly into the bowl in spaced relationship from the interior surface of the bowl. Accordingly, an annular channel 306 is defined between the flange 304 and the interior surface of the bowl.

Inside the shroud 300 is a rinse water distribution pipe 320 which extends about two-thirds of the way around the toilet bowl. The pipe opens into the annular channel 306 by way of three ports 324, one at each end of the pipe 320 and one intermediate its ends. A deflector plate (not shown) is positioned in front of each port 324. In a modification of the toilet system shown in FIGS. 1 and 2, the rinse water distribution pipe 320 might extend about three-quarters of the way around the toilet bowl and have four or more outlet ports spaced approximately equally around the toilet bowl. In another modification, the rinse water distribution pipe is in the form of a ring having numerous, e.g. ten or more, outlet ports spaced around the toilet bowl. In the latter case, it is not necessary to provide deflector plates to distribute water over the interior surface of the toilet bowl.

As shown in FIG. 1, the air supply member 302 is formed with numerous bores 352 which extend into the channel 306. The bores 352 are spaced apart around the member 302. In a practical implementation of the invention, there may be eighty such bores 352. For clarity of illustration, the bores 352 are shown in FIG. 1 as extending radially, but in fact the bores are inclined at an angle of about 5°–10° from the radial direction and all extend into the channel 306 in the counterclockwise direction with respect to the member 302, when viewed in plan. At its upper surface, the air supply member 302 is formed with grooves 358, which are shown only in FIG. 2. The grooves extend semi-tangentially with respect to the member 302 and are all directed inwardly in the counterclockwise direction when viewed from above. Of course, the bores 352 and grooves 358 may be directed clockwise instead of counterclockwise into the toilet bowl. In the modification in which the rinse water distribution pipe 320 is a ring formed with numerous outlet ports, the number of bores 352 may be equal to the number of rinse water outlet ports, with each bore debouching at an angular position that is midway between two adjacent rinse water outlet ports.

The toilet bowl 2 is provided with a seat 360 and a cover 362. The seat and the cover are mounted to the air supply member 302 by a hinge 364. When the seat 360 is lowered, it engages the air supply member 302. The seat 360 is split, as required by public hygiene regulations, and the resulting gap 366 at the front of the toilet bowl provides a rapid flow of air into the toilet bowl, and thereby prevents build-up of underpressure therein, in the event of a malfunction that causes the valve 6 to open when the toilet is in use. The cover 362 is shaped so that when it is lowered, the ambient atmosphere is not in direct open communication with the interior of the toilet bowl through the gap 366. In an alternative arrangement, the air supply member 302 is somewhat larger than the seat 360 and the downturned rim of the cover 362 seals against the air supply member when the cover is lowered. In this case, there are no grooves 358 in the upper surface of the air supply member. When the seat is lowered, it is spaced from the air supply member by about 1 cm, ensuring that air can enter the toilet bowl when the toilet is in use.

The hinge 364 incorporates a flush initiation switch 182, which is shown only schematically in FIG. 1. Alternatively, the switch 182 might have an actuator button that is engaged by a lever, e.g., when the cover 362 is closed. The flush initiation switch 182 is closed automatically when the cover is closed, and remains open when the cover is open.

The vacuum toilet system also comprises a hand basin 40 having a water valve 42 and an outlet pipe 44. The water valve 42 is connected through a pipe 46 to a source 48 of water under pressure. The water valve 42 is solenoid-operated and automatically closing. When a user presses a button (not shown), the control unit closes a switch that supplies electrical current to a solenoid, and the valve 42 opens. When the supply of current is discontinued, e.g. by removing pressure from the button, the valve 42 closes.

The outlet pipe of the hand basin 40 is connected to a gray water reservoir 338. Accordingly, gray water from the hand basin 40 is collected in the reservoir 338. Reservoir 338 is connected by a rinse water supply pipe 328 to the rinse water distribution pipe 320. The reservoir 338 is preferably placed close to the toilet bowl 2, in order to minimize the length of the pipe 328. However, it might alternatively be placed directly below the hand basin 40 like an enlarged water trap.

When the cover of the FIGS. 1 and 2 toilet is lowered, the flush control unit 180 issues a flush signal in response to the closing of the switch 182, and the discharge valve 6 is opened. Suction is applied to the interior space of the toilet bowl, and this suction ensures that the cover is held down in firm, sealing relationship against the seat. Due to the partial vacuum established in the interior space of the toilet bowl, air is drawn into the interior space of the toilet bowl through the grooves 358 and the bores 352. The air that enters the annular channel 306 through the bores 352 has a substantial peripheral component of velocity and therefore executes a swirling motion about the interior space of the bowl. The air entering the toilet bowl through the channels 358, which may alternatively be formed in the lower surface of the seat, executes a similar swirling motion.

When partial vacuum is established in the toilet bowl, suction is applied through the ports 324 and the water distribution pipe 320 to the water supply pipe 328. Water is drawn into the pipe 328 from the reservoir 338 and is discharged into the channel 306 through the ports 324. The water leaving the pipe 320 through the ports 324 impinges on the deflector plates, which cause the water to spray also upwards and to the side. The water entering the channel 306 is entrained into the swirling flow of air from the bores 352 and executes a similar swirling motion, cleansing the interior surface of the bowl. The flow of air adds kinetic energy to the flow of rinse water, enhancing the cleaning action of the water. The turbulent motion of air and water in the bowl may create a mist, which may flow upwards in the space defined by the interior surface of the flange 304 and result in deposit of mist droplets on the underside of the cover 362 and on the seat 360. This upward flow of mist is inhibited by the flow of air through the grooves 358.

After a predetermined time, the flush control unit 180 closes the discharge valve 6 and the underpressure inside the toilet bowl is relieved, so that it is no longer sufficient to draw water from the reservoir 62.

In order to ensure that the entire contents of the reservoir 62 are not sucked into the toilet bowl during a single flush, the rinse water supply pipe 328 is provided with a throttle 370. The throttle 370 allows sufficient gray water to flow to the toilet bowl while the discharge valve 6 is open during a single flush cycle to provide for thorough rinsing of the interior surface of the toilet bowl.

The pipe 328 slopes downwards towards the reservoir, so that when a flush is completed, water remaining in the pipe drains back into the reservoir, minimizing gray water usage. The slope also ensures that the pipe 320 is above the overflow 88 so as to prevent flooding of the toilet bowl.

The reservoir 338 is provided with an overflow 88, which also serves to vent the reservoir. The reservoir is provided with a level detector 372. If the level of water in the reservoir falls below the level detector 372, the control unit 180 causes a secondary control switch to close and supply current to the solenoid for the valve 42, which opens and supplies water to the reservoir.

For proper functioning of the system shown in FIGS. 1 and 2, it is necessary that the flow resistances of the paths for delivering air and water to the toilet bowl be balanced, so that the functions of the various flows are achieved. The proper balance is best achieved through experimentation. For example, it has been found that the greater part of the air flow should be provided through the bores 352, and in some applications the channels 358 might not be necessary.

The co-pending application discloses a vacuum toilet system in which gray water is employed as rinse liquid. The toilet bowl remains under ambient pressure, and the gray water is delivered to the toilet bowl using a pump and flow of gray water is controlled by valves. The gray water is introduced into the toilet bowl by use of fine spray nozzles. Because of the possibility that foreign matter will cause a malfunction of the pump or valves or will clog the spray nozzles, the gray water is filtered, and a mechanism is provided for cleaning the filter by backwashing. In the system shown in FIGS. 1 and 2, the water supplied through the outlet ports 324 is effectively distributed over the interior surface of the toilet bowl by the flow of air entering the toilet bowl and therefore there is no need for fine spray nozzles. Furthermore, there are no valves or pumps between the reservoir and the ports 324. Accordingly, the need for a filter is avoided and This in turn avoids the need to be able to backwash the filter. Of course, a strainer may be provided in the pipe outlet of the hand basin or in the drain pipe 44 to catch objects such as matches and buttons.

Reliance on a level detector to ensure that there is adequate water in the reservoir 338 is undesirable, because a level detector is subject to failure and it is then possible for the water source 68 to be drained. In a modification of the FIGS. 1 and 2 system, the need for a level detector is avoided by keeping track of the number of uses of the hand basin and the number of flushes of the toilet bowl. Thus, when the train is first brought into service at the beginning of a working day, the flush control unit automatically performs a power-up routine in which it opens the hand basin valve 42 for sufficient time to provide enough water to give up to five flushes. The flush control unit counts both the number of flushes during a preset period of time and the number of times that the hand basin valve is opened under manual control during that period, and utilizes this information to determine when there is a danger that the reservoir 338 is approaching an empty condition. If the flush control unit determines that the reservoir is approaching an empty condition, it causes the hand basin valve to open and provide additional water to the reservoir. In this manner, the need for a level detector in the reservoir is avoided.

The swirling flow of air that enters the toilet bowl of the FIGS. 1 and 2 system is quite effective at cleansing the toilet bowl even without the aid of rinse water. Therefore, in a further modification of the FIGS. 1 and 2 system the flush control unit is designed without the ability to count the number of flushes, so that if the reservoir runs dry, the toilet bowl is cleansed by the air flow only. In fact, the likelihood of the reservoir running dry is quite small, because normally more gray water is produced through use of the hand basin than is required for toilet flushings. In this modification, no overflow pipe is provided, so that excess gray water is not discharged from the system but passes into the toilet bowl and thence to the waste tank. Omitting the overflow pipe provides the advantage of reducing gravity flow connections and providing flexibility in locating the toilet bowl and reservoir. However, because of the danger of flooding the toilet bowl, it would not normally be satisfactory to omit the overflow pipe in an intallation where the toilet bowl is used infrequently.

As described so far, the system described with reference to FIGS. 1 and 2 is subject to limitation, in that it depends on a substantially constant pressure difference between the ambient atmosphere and the interior of the holding tank in order to ensure that the volume of gray water delivered to the toilet bowl is the same from flush to flush. Although it is relatively easy to maintain a substantially constant pressure difference in the case of a system installed in a train, where the ambient atmospheric pressure remains substantially constant, in an aircraft the cabin pressure varies widely depending on altitude and cabin pressurization and the pressure in the toilet bowl when the discharge valve is opened also can vary quite widely. FIG. 1 shows an optional mechanism for ensuring that the proper volume of rinse water is delivered to the toilet bowl at each flush even when the pressure difference between the ambient atmosphere and the interior of the holding tank is subject to substantial variation. As shown in FIG. 1, sensors 380 and 382 detect the cabin pressure in the aircraft and the pressure in the waste tank, and the flush control unit 180 controls the open interval of the discharge valve in dependence on the pressure difference. Thus, at a low pressure difference the open interval is longer than at a high pressure difference. This optional mechanism allows the FIGS. 1 and 2 system to be used in an aircraft.

Although the optional mechanism described with reference to FIGS. 1 and 2 meets one of the requirements of an aircraft vacuum toilet system, the FIGS. 1 and 2 system, including the optional mechanism, is not ideal for use in an aircraft. For example, the flow resistance between the discharge valve and the exterior of the aircraft depends on the location of the toilet bowl (forward or aft) so that the optimum flush time can vary widely, independently of the actual pressure difference between the interior of the toilet bowl and the ambient atmosphere, but the system described with reference to FIGS. 1 and 2 does not allow for this variable. Moreover, the system described with reference to FIGS. 1 and 2 includes a level detector to ensure that there will always be sufficient water in the reservoir 338 to execute a flush. Since a large passenger aircraft might have about 15 toilets, each with its own reservoir and level detector, the risk of failure of a level detector is significant, and if a level detector should fail, the entire potable water system might be emptied.

An aircraft vacuum toilet system is designed to operate using a very small volume of water (about 0.2 l) per flush. If the system uses more than the nominal amount of water per flush, it reduces the amount of potable water available for use by passengers during a flight. If the amount of rinse liquid used per flush is less than the nominal amount, the toilet bowl might not be properly cleansed. It is therefore essential that the quantity of rinse liquid introduced into the toilet bowl on each flush remain constant within fairly narrow limits.

Figure 3:
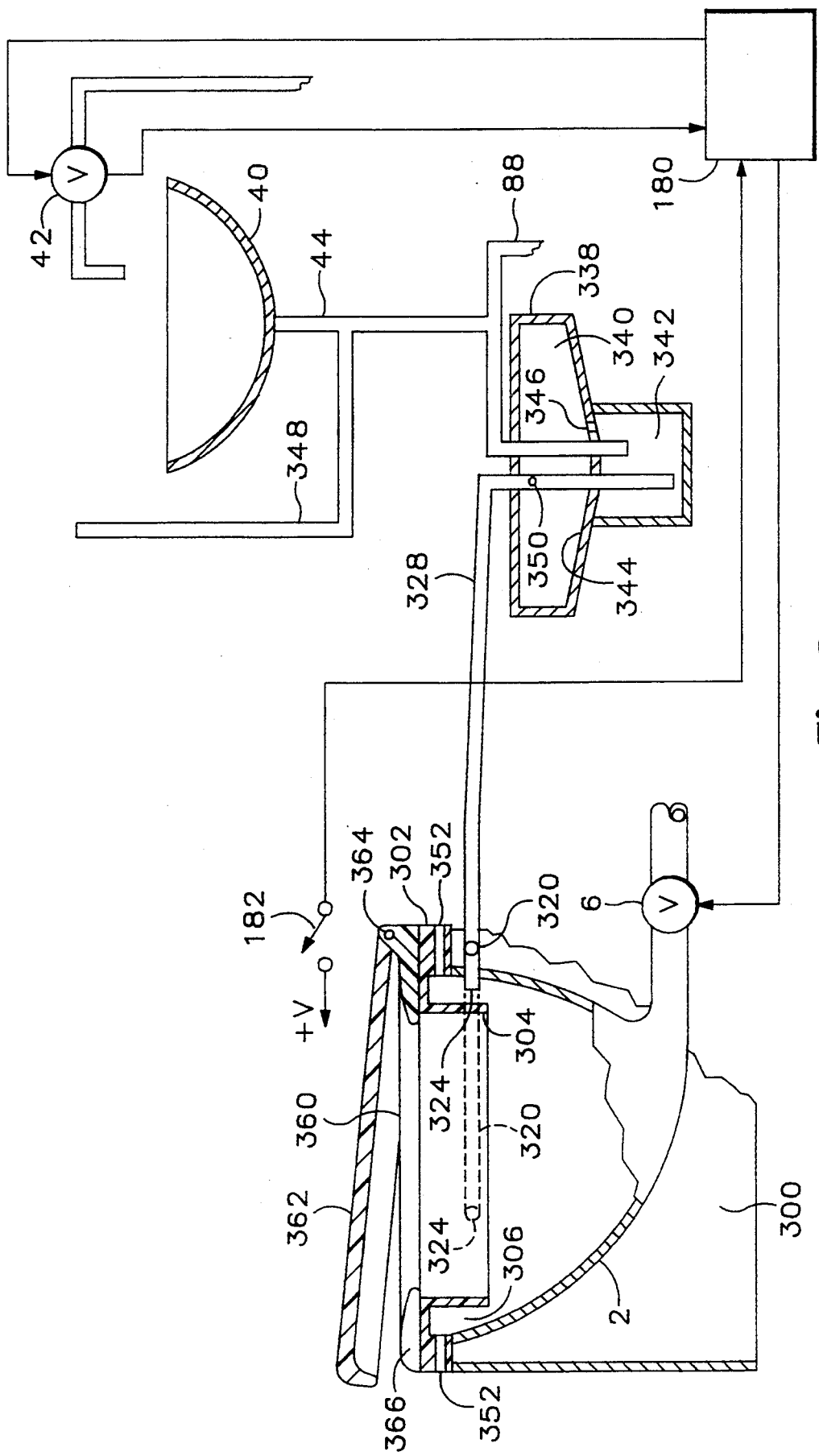
FIG. 3 is a part sectional schematic view of a second vacuum toilet system embodying the present invention.

In the modification illustrated in FIG. 3, the reservoir 338 is divided into upper and lower compartments 340, 342, which are separated by a wall 344 formed with a drain hole 346. The rinse water supply pipe 328 extends almost to the bottom of the lower compartment 342, and is formed with a small vent hole 350 just below the top of the upper compartment 340. The drain pipe 44 is configured so that it drains easily into the reservoir 338.

The overflow 88 is placed close to the reservoir to minimize the amount of water stored in the pipe 44 when the reservoir is filled up to the level of the overflow. The overflow leads to a drain mast at the exterior of the aircraft and is provided with a valve to isolate the drain pipe 44 from the external atmospheric pressure. The valve opens automatically when the water column above the valve reaches a predetermined height. The drain pipe 44 opens into the lower compartment 342, and when the lower compartment is full, additional gray water delivered into the lower compartment enters the upper compartment through the hole 346. When full, the lower compartment 342 contains enough water for one flush of the toilet, for example about 0.2 l. The aircraft cabin pressure is communicated to the lower compartment by the hand basin drain pipe 44 and by the rinse water supply pipe 328, the vent hole 350 and the drain hole 346.

When suction is applied to the water supply pipe 328, some air or water (depending on the filling level of the reservoir) is drawn from the upper compartment 340 into the pipe 328 by way of the vent hole 350, creating a lower pressure in the upper compartment than the lower compartment. When the liquid level in the lower compartment has fallen below the lower end of the pipe 44, air is sucked into the upper compartment through the vent 348 and the drain hole 346. Since air is passing upwards through the drain hole, the lower compartment is not refilled by gravity flow from the upper compartment during a flush. When the discharge valve 6 is closed, the pressure in the two compartments is equalized and water from the upper compartment 340 drains into the lower compartment, refilling the lower compartment. Thus, the lower compartment 342 functions as a metering device which, at each flush, delivers a predetermined volume of water and the upper compartment 340 serves to top-up the lower compartment after a flush. The volume of water delivered at each flush is approximately equal to the volume of the lower compartment plus the volume of water in the pipes 44 and 328 above the lower compartment. In order to minimize variations in volume, the pipes 44 and 328 should be relatively narrow, e.g. 1.25 cm in diameter. At low vacuum and short flush time, the lower compartment of the reservoir is just barely emptied, whereas at higher vacuum and/or longer flush time, the lower compartment is emptied well before the discharge valve 6 is closed.

Figure 4:
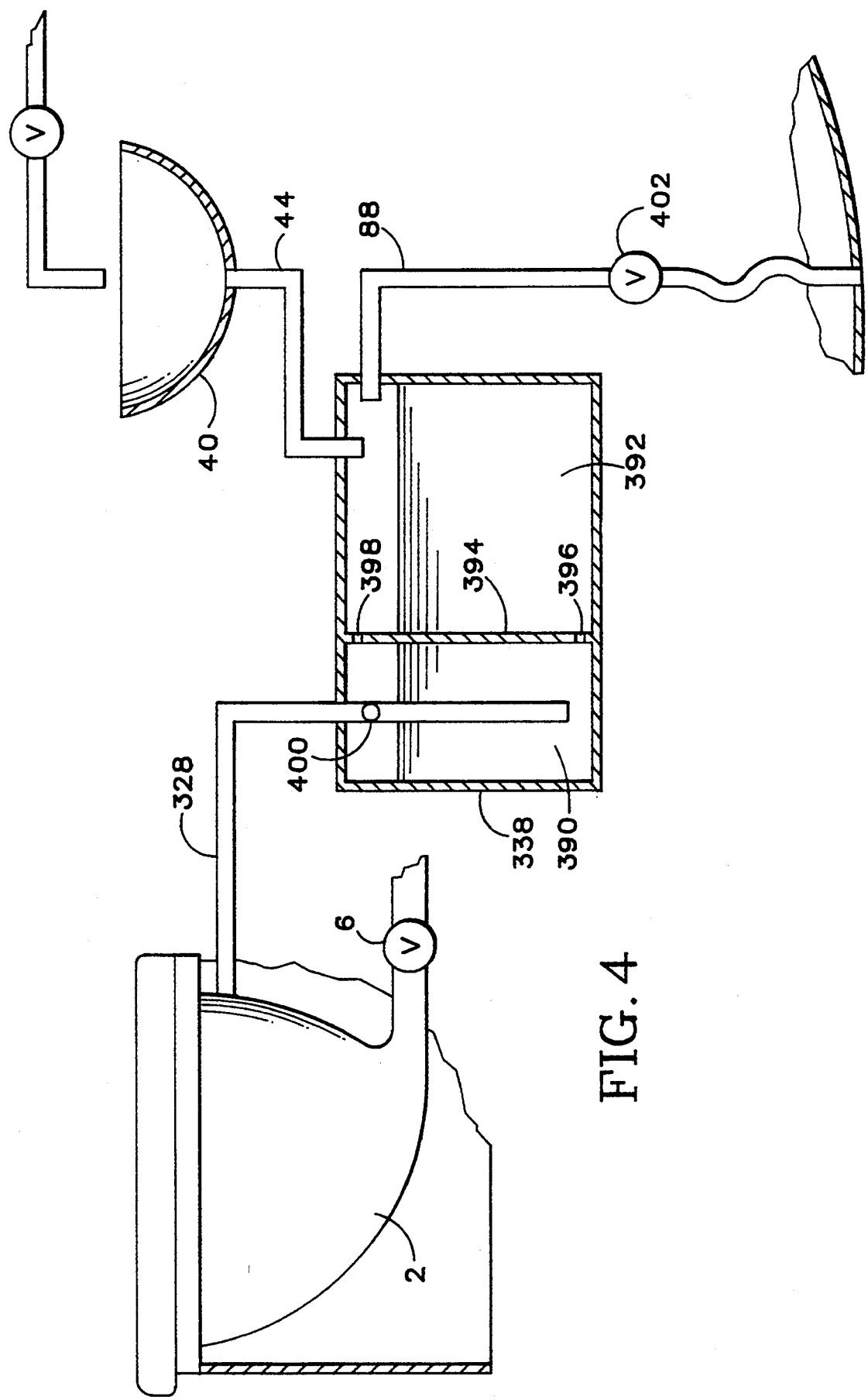
FIG. 4 illustrates a first modification of the system shown in FIG. 1.

FIG. 4 shows a further modification of the system shown in FIG. 3. In the case of FIG. 4, the reservoir 338 is divided into two compartments 390, 392 that are side-by-side and are separated by a wall 394. The overflow 88 is provided with a valve 402 to prevent flow of air through the overflow when the aircraft is at altitude and the cabin is pressurized. The valve opens automatically when the water column in the overflow 88 reaches a predetermined height above the valve. The wall 394 has a small drain hole 396 at the bottom and a larger vent hole 398 at the top. The pipe 328 is also formed with a vent hole 400. When partial vacuum is established in the toilet bowl by opening the discharge value 6, gray water is sucked from the smaller compartment 390 and is delivered to the toilet bowl as rinse liquid. The large vent hole 398 provides pressure equalization between the two compartments so that gray water in the large compartment 392 tends to flow into the small compartment 390 through the drain hole 396, but the drain hole is sufficiently small to prevent immediate refilling of the small compartment during the flush. Therefore, the entire contents of the reservoir 338 are not removed during a single flushing operation, and the smaller compartment is replenished from the large compartment after the discharge valve 6 is closed and partial vacuum is removed from the pipe 328. The vent holes 398 and 400 vent the downstream end of the drain pipe 44. The vent holes further ensure that during a flush operation, an underpressure is created in the reservoir and this tends to draw any debris in the drain line into the reservoir.

A disadvantage of the system shown in FIG. 4 is that the volume to which the compartment 390 is filled depends on the volume of water in the compartment 392, so that it is necessary to provide an automatic top-up system to replenish the reservoir and make sure that the compartment 390 is full in order to ensure a constant volume of water on each flush. A further disadvantage of the system shown in FIG. 4 is that the hole 396 needs to be very small in order to provide a significant flow resistance to water flowing from the compartment 392 to the compartment 390 during a flush, and so the hole would be subject to blockage due to foreign matter in the gray water.

Figure 5:
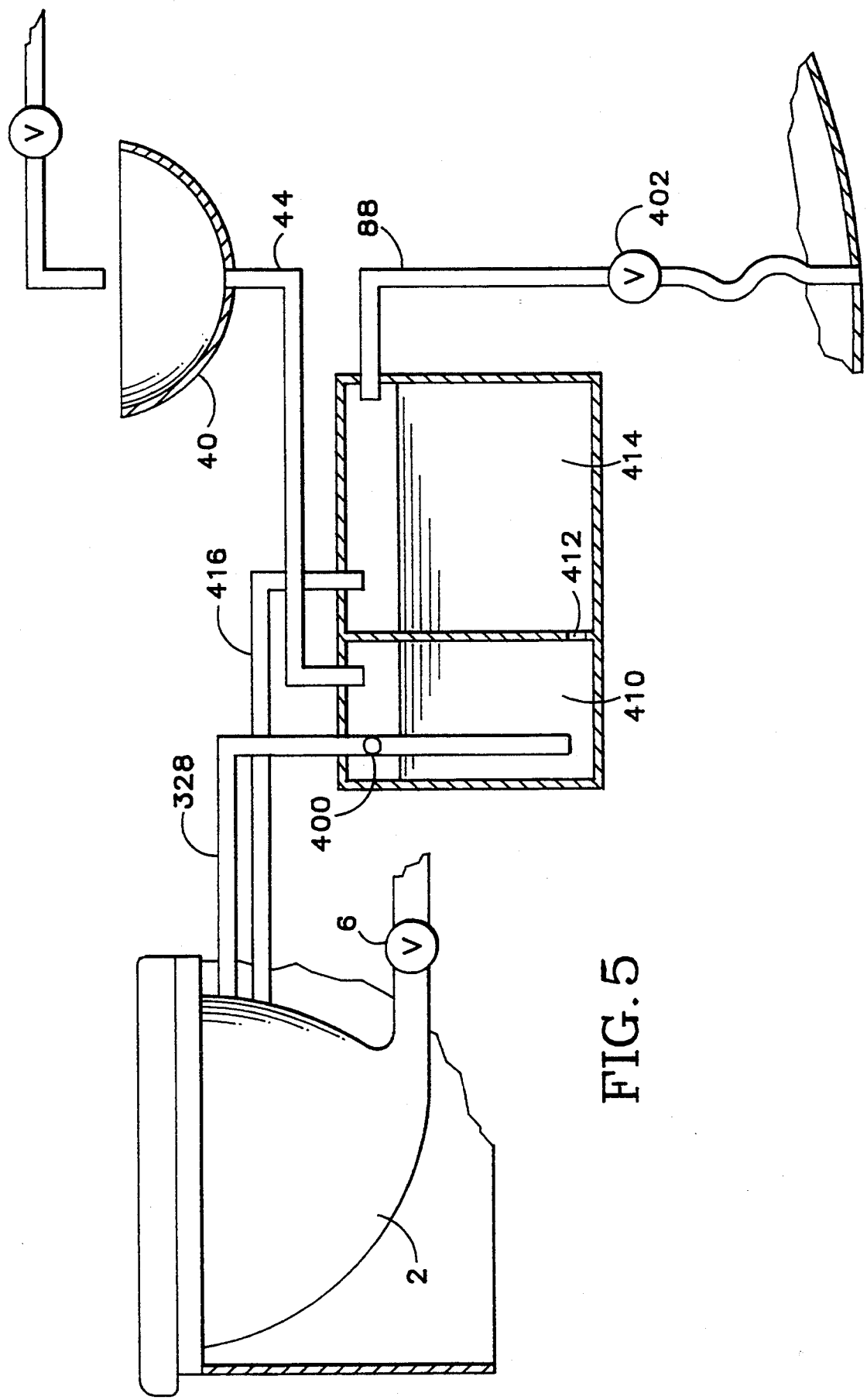
FIG. 5 illustrates a second modification of the system shown in FIG. 1.

FIG. 5 illustrates yet another modification of the system shown in FIG. 1. In the case of FIG. 5, the drain line from the hand basin opens into the small compartment 410, similarly to FIG. 3, and a relatively large drain hole 412 is provided between the small compartment and the large compartment 414. The small compartment 410 is vented through the vent hole 400, and the large compartment 414 is vented by way of a separate vent line 416 that is connected to the toilet bowl. When the toilet bowl is closed and the discharge valve 6 is opened, partial vacuum in the toilet bowl inducts gray water from the compartment 410. The drain pipe 44 serves as an air inlet, limiting the underpressure created in the compartment 410. The vent line 416 applies partial vacuum to the compartment 414, so that the water in that compartment does not flow through the drain hole 412 into the compartment 410. When the compartment 410 is empty, air supplied by the drain pipe 44 is divided among the vent hole 400, the mouth of the pipe 328 and the vent line 416, so that air passes through the drain hole 412 and prevents water draining from the compartment 414 into the compartment 410 before the flush operation is completed. When the discharge valve is closed and pressure equalization is achieved between the interior and exterior of the toilet bowl, the vent line 416 allows air to enter the compartment 414 and water can flow through the drain hole to refill the compartment 410. It is necessary to balance the pressures that are created during a flush operation to limit flow of water from the compartment 410 into the compartment 414 due to atmospheric pressure being communicated to the compartment 410 while an underpressure is created in the compartment 414.

The arrangement shown in FIG. 5 is subject to the disadvantage that the volume to which the compartment 410 is filled depends on the volume of water in the compartment 414, so that it is necessary to provide an automatic top-up system to replenish the reservoir and make sure the compartment 410 is full in order to ensure that the desired volume of water is supplied at each flush.

The toilet systems shown in FIGS. 3-5 are not restricted to use on an aircraft, and a similar system might be installed in a ship or train, for example. In the case of a system designed for use otherwise than on an aircraft, factors relating to the type of installation might dictate modifications. For example, in the case of a system on a ship, where the volume of waste is unimportant because it is pumped overboard, the pipe 328 might slope down towards the toilet bowl so that at the end of a flush, water in the pipe 328 drains into the toilet bowl and forms a pool of water. When designed for use in an aircraft, a vacuum toilet system as shown in FIG. 3, possibly modified in accordance with FIG. 4 or 5, may be incorporated in a self-supporting module that is installed in the aircraft as a unit. The module comprises a toilet bowl and associated discharge valve, a hand basin, and a reservoir. The module is self-contained except for connections to the vacuum sewer, the potable water supply and, if necessary, the aircraft drain system. If the modification of the FIGS. 1 and 2 system, where no overflow pipe is provided, were employed in this form of the FIG. 3 system, relocation of the toilet module would be facilitated because there would then be no gravity line leaving the module.

It will be appreciated that the invention is not restricted to the particular embodiments that has been described, and that variations may be made therein without departing from the scope of the invention as defined in the appended claims and equivalents thereof. For example, in the train system shown in FIGS. 1 and 2, it might be desirable to employ a compressed air cylinder to drive the valve 6 and to employ a compressed-air-driven ejector to act as a vacuum pump instead of the blower 12.

We claim:

1. A vacuum toilet system comprising:
   (a) a toilet bowl having a rim and an outlet opening,
   (b) a toilet bowl cover mounted for movement relative to the toilet bowl between an open position and a closed position,
   (c) a sewer pipe having an interior space,
   (d) means for establishing a partial vacuum in the interior space of the sewer pipe,
   (e) a normally closed discharge valve connecting the outlet opening of the toilet bowl to the sewer pipe, and
   (f) means defining a liquid supply opening for introducing liquid into the toilet bowl,
   the system being of the kind in which the interior space of the sewer pipe is placed under partial vacuum and sewage in the toilet bowl is forced into the sewer pipe by pressure difference between the toilet bowl and the interior space of the sewer pipe when the discharge valve is opened, and sewage is transported along the sewer pipe due to entry of ambient air into the sewer pipe,
   and wherein the toilet bowl cover is in at least partially sealing relation with the rim when in the closed position and the system further comprises:
   (g) a source of rinse liquid,
   (h) a reservoir having an inlet opening for receiving rinse liquid from the source and an outlet opening in communication with the liquid supply opening, the inlet opening of the reservoir being exposed to substantially the same pressure as the liquid supply opening when the cover is in the open position and the discharge valve is closed, and wherein the reservoir defines a first compartment, a second compartment, aperture means providing gravity controlled communication between the first and second compartments, and vent means for supplying air to the first compartment, whereby liquid in the first compartment is able to flow into the second compartment by way of said aperture means, and (i) a pipe that extends from the second compartment and debouches into the toilet bowl at the liquid supply opening, whereby rinse liquid is drawn from the reservoir into the toilet bowl by way of the liquid supply opening when the discharge valve is open and the cover is in the closed position, the volume of rinse liquid that is drawn from the reservoir being substantially the same on each flush of the toilet bowl.

2. A vacuum toilet system according to claim 1, comprising a second pipe that is connected to the source of rinse liquid and debouches into the second compartment.

3. A vacuum toilet system according to claim 1, installed in a transport vehicle.

4. A vacuum toilet system according to claim 3, wherein the transport vehicle is an aircraft.

* * * * *